June 23, 1959  K. L. BROWN ET AL  2,891,876
PRIMERS FOR VINYL CHLORIDE RESIN COATINGS
Filed Oct. 10, 1956
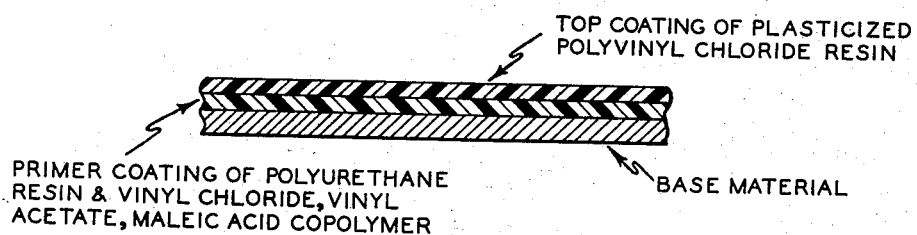
TOP COATING OF PLASTICIZED POLYVINYL CHLORIDE RESIN
PRIMER COATING OF POLYURETHANE RESIN & VINYL CHLORIDE, VINYL ACETATE, MALEIC ACID COPOLYMER
BASE MATERIAL
INVENTORS
KENNETH L. BROWN
WILLIAM H. McKNIGHT
BY Louis Smith
ATTORNEY

United States Patent Office 2,891,876
Patented June 23, 1959

2,891,876

PRIMERS FOR VINYL CHLORIDE RESIN COATINGS

Kenneth L. Brown, Library, and William H. McKnight, Pittsburgh, Pa., assignors to Union Carbide Corporation, a corporation of New York No Drawing. Application October 10, 1956
Serial No. 615,005

9 Claims. (Cl. 117—72)

This invention relates to a primer useful in effecting the adhesion of a coating of a vinyl chloride resin to metal and other materials, for example, nylon. The coated articles also form a part of the invention.

Due to the well known inertness of vinyl chloride type resins, the problem of poor adhesion to most surfaces has been a continuing one which has limited the fields of application of these resins. These resins generally do not contain highly polar groups which set up a strong attraction to metals and glass, for example. The resins depend for adhesion on mechanical factors, that is the presence of rough or porous surfaces which the resin can penetrate to form "teeth" or "anchors." Generally, any but the most highly polished surfaces have enough surface roughness to insure adequate adhesion were it not for the shrinkage of the films during hardening or on aging. The shrinkage tends to disrupt the mechanical connections of the film to the substrate. In some instances, the mechanical adhesion can be restored by heating the dry film to soften and reflow it and permit the formation of new mechanical anchors. Often, however, this is impractical because the high heat required degrades the resin excessively.

The problem of poor adhesion of vinyl chloride type resins has been attacked by several methods with a measure of success. Chemical modification of the resin itself improves adhesion when such modification introduces strong polar groups. An example of this type of modification is the introduction of carboxyl groups (such as from maleic acid) into a vinyl chloride-acetate polymer by copolymerization. An example of this type of resin is described in United States Patent No. 2,329,456. Another resin which also shows adhesion to certain surfaces by reason of the introduction of hydroxyl groups into the resin by hydrolysis is described in United States Patent No. 2,512,726. However, not all types of vinyl resins can be modified satisfactorily with either acid or hydroxyl groups.

The adhesion of vinyl resins can be improved by numerous formulating modifications, such as mixing the resins with compatible materials having excellent adhesive properties. Pigmentation also tends to improve adhesion by reducing overall volumetric shrinkage of the coating on drying and also because many pigments have, in themselves, some attractive forces for polar surfaces. These techniques either separately or together have not in general been adequate to insure good adhesion of vinyl chloride resins, but can assist or improve adhesion developed in the main by other means.

Another method of improving the adhesion of vinyl chloride resins is through the use of special primers. Thus, a primer based on the adherent types of vinyl resins mentioned above can be finished with the non-adhering vinyl resins to produce good adhesion. Certain non-vinyl primers have also been used, but their number is restricted by the limited compatibility of vinyl chloride resins. Only in rare cases will one film adhere to another if the resin components of the two films are incompatible. Nevertheless, satisfactory vinyl and non-vinyl primers can be used in a number of cases to secure good adhesion to many surfaces and under many different conditions.

Were it not for one additional factor to be discussed now, it could be said that the problem of obtaining adhesion of vinyl chloride resin coatings could be accomplished to some degree by known modifications, formulations, or special primers.

The monomeric plasticizers normally used in high polymer, vinyl chloride resins tend to migrate into other films with which they come into direct contact. This behavior is largely responsible for the difficulty which has been encountered in obtaining good adhesion of plastisols or other plasticized high polymers. For example, the carboxyl- or hydroxyl-modified vinyl resins which adhere to smooth surfaces are relatively low in average molecular weight. High polymer materials require 40 or more parts of plasticizer to 100 parts of resin in order to impart good flexibility. When a film containing this quantity of any of the primary plasticizers comes in contact with films of the adherent polymers, migration of the plasticizer occurs to the extent that the adherent lower polymer is made soft and cheesy and thus loses adhesion. One obvious way to eliminate this problem would be to use a primer which had been thermoset or otherwise rendered insoluble in the vinyl chloride plasticizers and solvents. This approach has been tried, and with some success. However, it has been observed that when the primer is thermoset to the point that it is insoluble in the ester type plasticizers, the vinyl chloride topcoats will no longer adhere to it. This makes the formulation of primers by this means impractical for industrial use. This same difficulty was also encountered with non-vinyl primers. That is, when the primer was formulated to be relatively insoluble in the primary vinyl plasticizers so that softening would not occur, the plasticized high polymer vinyl topcoats did not adhere.

The principal object of the invention is to provide a primer which will adhere to smooth surfaces and to which plasticized vinyl resin coatings, for example vinyl plastisols, will adhere.

A more particular object of the invention is to provide a primer which permits the coating of metals and nylon with vinyl chloride plastisols.

The improved primer composition of the invention comprises a blend of a polyurethane resin and vinyl chloride-vinyl ester-maleic acid or anhydride copolymer. The invention will be more fully understood from the following description and by reference to the accompanying drawing of a single figure illustrating a cross-sectional view of a plasticized polyvinyl chloride resin adhering to a substrate material by means of a primer consisting essentially of a polyurethane resin and a vinyl chloride-vinyl ester-maleic acid copolymer.

The preferred polyurethane resin comprising one component of the primer composition is a resin obtained by adding one mol of polyethylene glycol (molecular weight about 400) to two mols of toluene diisocyanate.

In one instance the preferred polyurethane resin was prepared by charging toluene diisocyanate into a vessel containing agitation equipment. Polyethylene glycol was then added to the vessel through a dropping funnel. The addition was at the rate of approximately 750 grams in 20 minutes. The materials were agitated and the reaction proceeded exothermically. The temperature in the vessel reached a maximum of about 115° C. and then dropped to 65°–70° C. The product was stored in sealed containers either with or without dilution with toluene. The reaction mixture had a viscosity of about 42,800 centipoises at 25° C.

If solution preparation is desired, the solvents may be mixed with either the isocyanate or hydroxy compound or divided between the two reactants. The glycol is normally added to the isocyanate in order to maintain an excess of isocyanate until the reaction is finished. The polyurethane resin may be prepared in a number of solvents. Aromatic hydrocarbons, esters such as ethyl acetate, and chlorinated solvents are examples of solvents which can be used. Solvents with active hydrogen atoms should be avoided since they will react with the isocyanates.

The vinyl chloride-vinyl ester-maleic anhydride copolymer, which is preferred, is one having the approximate composition:

| | Weight percent |
|---|---|
| Vinyl chloride | 85–88 |
| Vinyl acetate | 11.0–14.3 |
| Maleic acid | [1] 0.5–0.8 |

[1] Calculated as carboxyl.

The preferred primer composition is prepared as follows:

The vinyl-maleic resin is dissolved in a 50–50 mixture of toluene and methyl isobutyl ketone to make a solution of 20% by weight concentration. To this solution the polyurethane resin is added.

To determine the usefulness of these compositions as primers for polyvinyl chloride plastisols, a number of compositions were prepared employing different ratios of the polyurethane resin and vinyl-maleic resin described above. These were applied to bare tinplate panels and baked for 10 minutes at 350° F.

A plastisol was then prepared by mixing 100 parts (by weight) of a polyvinyl chloride resin having an ultimate particle diameter size of 0.7 to 1.0 micron range with 30 parts 2 ethyl hexyl diphenyl phosphate, 90 parts di(2 ethyl hexyl) sebacate, 180 parts whiting (calcium carbonate) and 5 parts titanium dioxide until a spreadable, pasty, finely divided suspension was obtained having a viscosity of about 5000 centipoises at 25° C.

The plastisol, as above prepared, was applied to the primer-coated tinplate panels in a film of about 15 mils thickness and then baked for 10 minutes at 350° F.

The adhesiveness of both primer and plastisol was determined by bending the test panels over a ¼" diameter mandrel, slitting the coating at the bend with a razor blade. The plastisol did not pull away from the primer at room temperature (25° C.) or after being in an autoclave and subjected to 14 pounds steam pressure for one minute.

In Table I below are listed several primer compositions which exhibited substantially the same properties in the above test:

TABLE I

| | Parts by Weight | | | | |
|---|---|---|---|---|---|
| Polyurethane Resin | 100 | 100 | 100 | 100 | 100 |
| Vinyl-Maleic Resin | 20 | 40 | 60 | 100 | 200 |

Tests in which only the polyurethane resin or the vinyl-maleic resin were applied to the metal demonstrated that these materials alone were unsatisfactory in that the plasticized vinyl topcoats did not adhere to the primed metal under the test conditions.

It is evident from the above tests that compositions comprising one to two parts of vinyl-maleic resin to five to one parts of polyurethane resin based on the dry weight of the resin are satisfactory primers for polyvinyl chloride plastisols. The preferred system is one containing between one to two parts vinyl-maleic resin to one part of polyurethane resin.

To demonstrate the effectiveness of the primer of the invention with other substrates, the primer was tested as a size for synthetic fabrics such as nylon and "Orlon." In these tests the preferred polyurethane resin at 100% solids or 50% solids in toluene was mixed with the preferred vinyl chloride-vinyl ester-maleic anhydride copolymer at 20% solids in suitable solvents to give a solids ratio by weight of 1:2. Suitable solvents for the primer system are blends of aromatic hydrocarbons and aliphatic ketones such as acetone, methyl ethyl ketone, methyl isobutyl ketone, or tetrahydrofuran. For application, the primer was thinned to 5–10% solids with blends of the solvents previously cited. The nylon cloth was sized by dip coating; however, other suitable methods of application such as roller coating, knife coating or spraying would be applicable. The sized cloth was then force-dried 10 minutes at 350° F. after which the plastisol was applied and fused at 350° F. The fusing time at 350° F. will depend on the plastisol formulation and film thickness but normally a 5 to 10 minute fusing time was adequate.

The adhesiveness of the plastisol to the primed nylon cloth was determined by measuring the pounds pull necessary to strip the plastisol from the cloth after the initial break in the plastisol film. In all tests with five different plastisol formulations, the strip adhesion of the plastisols on primed nylon cloth was significantly better than that on unprimed cloth. The data in Table II illustrate the improvement in adhesion. The primer user in the tests reported in Table II had a composition of 18.2% by weight polyethylene glycol (molecular weight about 400), 15.8% toluene diisocyanate, and 66% of a vinyl copolymer having an approximate composition of 85–88% vinyl chloride, 11–14.3% vinyl acetate, 0.5–0.8% maleic acid (calculated as carboxyl). The plastisol had a composition of 100 parts vinyl chloride to 60 parts of a plasticizer. Two plasticizers were used and results for each are reported in Table II. The primer was applied with a number of thinning formulations. These thinners are also disclosed in the table.

TABLE II

| Thinner System for Primer | Plasticizer | Average Strip Adhesion in Pounds |
|---|---|---|
| 50 Methyl Isobutyl Ketone—50 Toluene | Di-(oxo)decyl phthalate | 8.1 |
| 50 Ethyl Acetate—50 Toluene | | 10.2 |
| 50 Methyl Ethyl Ketone—50 Toluene | | 8.9 |
| 50 Acetone—50 Toluene | | 10.9 |
| 50 Tetrahydrofuran—50 Toluene | | 11.6 |
| Control—No Primer | | 2.5 |
| 50 Methyl Isobutyl Ketone—50 Toluene | Mixed Phthalate Ester | 6.4 |
| 50 Tetrahydrofuran—50 Toluene | | 9.0 |
| Control—No Primer | | 1.1 |

Primer compositions with weight ratios of the vinyl copolymer to the polyurethane resin 3:1 and 5:1 were also tested and found to impart adhesion of the plastisol to nylon cloth. However, the preferred primer system, 2:1 ratio, gave the highest strip adhesion values.

For purposes of comparison, both the polyurethane resin and the vinyl chloride-vinyl ester-maleic anhydride copolymer were tested separately as primers and failed to impart any appreciable adhesion to the plastisol.

While the polyurethane resin previously described has been found most satisfactory, other polyurethane resins can also be used. Examples of diisocyanates which can be employed in making the resins are 2,4 tolylene diisocyanate; 3,3' dimethyl 4,4' biphenylene diisocyanate; 3,3' dimethoxy 4,4' biphenylene diisocyanate; 4,4' diphenyl methane diisocyanate and 4,4' methylene di-o-tolyl isocyanate. These diisocyanates are reacted with polyalkylene glycols, e.g. polyethylene glycols having molecular weights of about 400 to 600 to give suitable urethane resins.

While examples have been given for polyethylene glycols, other polyalkylene glycols, e.g. polypropylene glycols or mixed polyethylene and polypropylene glycols can be used.

A preferred ratio for the reactants to give the urethane resin is one mol of polyalkylene glycol to two mols of diisocyanate, or a NCO/OH ratio of about 2. Satisfactory results are obtained when this ratio is within the limits of from 1.2 to 3.

The copolymers of vinyl halides, vinyl esters and an acid or anhydride suitable for use in this invention are more completely disclosed in United States Patent No. 2,329,456. The vinyl ester is an ester of a lower saturated fatty acid. The acid is preferably maleic and must be an aliphatic alpha, beta-mono-olefinic carboxylic acid. The carboxylic acid should be between 0.1% and 4% by weight of the polymer with the carboxylic groups being substantially unreacted.

The solvents used in preparing the primer compositions are preferably aliphatic or cycloaliphatic ketone solvents such as methyl ethyl ketone, methyl isobutyl ketone, cyclohexanone and the like. However, a wide variety of solvents may be used in preparing the primer compositions provided the solvent combination exhibits solvency for the vinyl chloride-vinyl ester-maleic acid or anhydride copolymer. Aliphatic hydrocarbons and hydroxyl bearing solvents such as alcohols and glycol ethers should be avoided.

The primer composition may be applied to the metal plate in any conventional manner and is then baked for about 15 minutes at 225° to 375° F. Pigmented as well as unpigmented systems are satisfactory. Primer compositions pigmented with titanium dioxide with a pigment-binder ratio of 1 to 4 to 2 to 1 have proven satisfactory. The dry film thickness should be about 0.5 mil or less.

A large number of plastisol formulations can be used with the primer of the invention. In general, the lower the viscosity of the plasticizer, the lower the viscosity of the plastisol. The plasticizer must be capable of wetting and dispersing the resin at room temperature and yet must not strike into the resin particles and swell or dissolve them under these conditions. If the solvent action of a plasticizer is too great, the resulting plastisol will increase in volume at the expense of the liquid phase.

Many vinyl resins may be used for preparing the plastisols. Particularly good results are obtained with plastisols made with resins of the vinyl chloride type, e.g. polyvinyl chloride or copolymers relatively high in vinyl chloride content. The resins should of course be high in molecular weight and preferably are made up of extremely small, essentially spherical particles having a diameter of from 0.7 to 1.0 micron.

Additional examples of the preparation and use of the primer of the invention are given below. In the examples, parts are parts by weight.

*Example 1*

(a) *Polyurethane resin.*—400 parts (1.0 mol) of polyethylene glycol (molecular weight about 400) was added to 348 parts (2.0 mols) toluene diisocyanate at room temperature. After the addition was completed, the mixture was stirred until the reaction temperature had reached its maximum (approximately 115° C. for this charge) and then dropped to 65–70° C. At this point the reaction mixture was transferred to a sealed container. The resulting resin was a smooth, viscous, amber-colored liquid having a viscosity of about 42,800 centipoises at 25° C.

(b) A vinyl chloride-vinyl ester-maleic anhydride copolymer, of the approximate composition 85–88% vinyl chloride, 11.0–14.3% vinyl acetate, and 0.5–0.8% carboxyl, was dissolved in a mixture of equal volumes of toluene and methyl isobutyl ketone. The copolymer constituted 20% by weight of the solution. 75 parts of the resin described in (a) were added to 750 parts of the solution. The product, which was clear and amber-colored, was applied to bare tinplate in about 0.3–0.5 mil film thickness and baked for 10 minutes at 350° F.

The following plastisol was cast at 15 mils thickness over replicate sets of primer coated tinplate and baked at 350° F. for 10 minutes.

PLASTISOL

| | Parts |
|---|---|
| Polyvinyl chloride resin | 100 |
| Whiting | 180 |
| Titanium dioxide | 5 |
| 2 ethyl hexyl diphenyl phosphate | 30 |
| Di(2 ethyl hexyl) sebacate | 90 |

Replicate samples were tested by bending over a ¼" mandrel and slitting the coating at the bend with a razor blade. Adhesiveness was good both at room temperature and after being in an autoclave subjected to 14 pounds steam pressure.

*Example 2*

75 parts of the resin described in Example 1(a) were added to 375 parts of the 20% solution of the vinyl chloride-vinyl ester-maleic anhydride copolymer described in Example 1(b). The reaction product was tested as a primer composition for a plastisol composition as described in Example 1 and the adhesiveness was good at room (25° C.) and higher temperatures.

*Example 3*

75 parts of the resin described in Example 1(a) were added to 225 parts of the 20% solution of the copolymer described in Example 1(b). The reaction product was tested as a primer composition as described in Example 1(b) and the adhesiveness was good at room and higher temperatures.

*Example 4*

Using the polyurethane resin described in Example 1(a), pigmented primer compositions were prepared as follows:

A quantity of a base pigment grind was prepared by grinding together 64.4 parts by weight of titanium dioxide, 7.1 parts of the vinyl chloride-vinyl ester-maleic anhydride copolymer described in Example 1(b), and 18.5 parts of a mixture of equal volumes of toluene and methyl isobutyl ketone.

(a) 34 parts polyurethane resin (Example 1(a)) were added to 156 parts of the base pigment grind and 275 parts of the 20% solution of the vinyl copolymer described in Example 1(b).

(b) 34 parts of the resin described in Example 1(a) were added to 233 parts of the base pigment grind and 247 parts of the 20% solution of the vinyl copolymer described in Example 1(b).

(c) 34 parts of the resin described in Example 1(a) were added to 311 parts of the base pigment grind and 220 parts of the 20% solution of the vinyl copolymer described in Example 1(b).

The ultimate pigmented primer compositions were then as follows:

| | a | b | c |
|---|---|---|---|
| Titanium dioxide | 100 | 150 | 200 |
| Polyurethane Resin | 66 | 66 | 66 |
| Vinyl copolymer | 34 | 34 | 34 |

These primer compositions, when tested as primers for a plastisol composition as described in Example 1(b), exhibited good adhesiveness both at room (25° C.) and higher temperatures.

*Example 5*

(a) *Polyurethane resin.*—40 parts (0.1 mol) of polyethylene glycol (molecular weight 400) were added to 52.2 parts (0.3 mol) of toluene diisocyanate and the reaction conducted as described in Example 1(a). The resulting resin was an amber-colored composition having a viscosity of about 2800 centipoises at 25° C.

(b) 75 parts of the polyurethane resin were added to 750 parts of the 20% by weight solution of the vinyl copolymer described in Example 1(b). The resulting solution was clear and pale amber in color. It was applied to bare tinplate in about 0.3–0.5 mil film thickness and baked for 10 minutes at 350° F. It was tested as a primer for a plastisol as described in Example 1(b) and exhibited good adhesiveness at room and higher temperatures.

Examples 1–5 described the use of the primer compositions of this invention with plastisols. The resistance of the primers to softening by plasticizers, especially at elevated temperatures, recommends their use with other vinyl chloride compositions. The following examples are illustrative of the excellent adhesiveness obtained when these primers are used with organosol compositions.

Example 6

The primer composition described in Example 1 was tested as a primer for the following organosol compositions.

|  | Parts | |
|---|---|---|
|  | A | B |
| Titanium dioxide |  | 22 |
| Vinyl Resin (95% vinyl chloride, 5% vinyl acetate) | 100 | 100 |
| Di-2 ethyl hexyl phthalate | 40 | 30 |
| Disobutyl Ketone | 50 | 50 |
| Petroleum Solvent | 40 | 40 |
| (B.P. range 250–300° F. and Kauri Butanol Value of 39). |  |  |

The organosol was applied to the primer coated plate in a thickness varying from 1 to 5 mils.

Adhesion was excellent both at room temperature (25° C.) and after being in an autoclave subjected to 14 pounds' steam pressure.

Example 7

The primer composition described in Example 4(a) was tested with the organosol compositions described in Example 6. The adhesiveness of the coating was excellent at room (25° C.) and higher temperatures.

The following example is illustrative of the excellent adhesiveness obtained when these primers are used with solution grade polyvinyl chloride copolymer resins.

Example 8

The primer composition described in Example 1 was tested as a primer for the following polyvinyl chloride copolymer solution:

| | Parts |
|---|---|
| Vinyl resin (87% vinyl chloride, 14% vinyl acetate) | 20 |
| Toluene | 40 |
| Methyl isobutyl ketone | 40 |

The primer and vinyl copolymer were applied to tinplate panels by reverse-roll coating. The primer thickness was 0.4±0.1 mil and the vinyl top coat was 1±0.2 mil.

Adhesion was excellent both at room temperature (25° C.) and after being in an autoclave subjected to 14 pounds' steam pressure.

The resistance of this coating system to hard-to-contain liquids was tested. After 8 weeks' exposure at 100° F. this coating was resistant to liquid detergents, battery acid (1.25 specific gravity sulfuric acid), and a commercial sodium hypochlorite bleach solution.

Example 9

The primer described in Example 1 was applied to 2.4 ounce nylon cloth. The primer was applied by dipping strips of the cloth into a 7.5% solids solution consisting of the primer and a 50:50 mixture of toluene and methyl isobutyl ketone. The primer was dried in the air at room temperature for 30 minutes and then heated for 10 minutes at 350° F.

The following plastisol was applied to one side of the primed cloth and heated at 350° F. for 5 minutes. Another coat of plastisol was applied to the reverse side and heated for 10 minutes at 350° F.

PLASTISOL

| | Parts |
|---|---|
| Polyvinyl chloride resin | 100 |
| Di(oxo)decyl phthalate | 60 |

The strip adhesion of replicate samples using the test procedure previously described was determined. The average strip adhesion of the plastisol from the prime nylon cloth was 8.1 pounds' pull and that on unprimed nylon cloth was 2.5 pounds' pull.

In Examples 10 through 16, additional samples of cloth were coated in a manner similar to that described in Example 9 and the adhesion of the primer and coating tested.

Example 10

The primer composition described in Example 9 was tested with a plastisol formulated with a plasticizer comprising mixed phthalate ester. The average strip adhesion of the plastisol from the primed nylon cloth was 6.4 pounds' pull as compared to 1.1 pounds' pull on unprimed nylon cloth.

Example 11

The primer composition and plastisol described in Example 9, except the primer solvent system was a 50:50 mixture of toluene and tetrahydrofuran, was tested. The average strip adhesion from primed nylon cloth was 11.6 pounds' pull as compared to 2.5 pounds' pull on unprimed nylon cloth.

Example 12

The primer composition and plastisol described in Example 10, except the primer solvent system was a 50:50 mixture of toluene and tetrahydrofuran, was tested. The average strip adhesion from primed nylon cloth was 9.0 pounds' pull as compared to 1.1 pounds' pull on unprimed cloth.

Example 13

The primer composition and plastisol described in Example 9, except the primer solvent system was a 50:50 mixture of toluene and acetone, was tested. The average strip adhesion from primed nylon cloth was 10.9 pounds' pull as compared to 2.5 pounds' pull on unprimed nylon cloth.

Example 14

The primer composition and plastisol described in Example 9, except the primer solvent system was a 50:50 mixture of toluene and methyl ethyl ketone, was tested. The average strip adhesion from primed nylon cloth was 8.9 pounds' pull as compared to 2.5 pounds' pull on unprimed cloth.

Example 15

A primer composition was prepared by mixing 75 parts of the polyurethane resin described in Example 1(a) with 1125 parts of the vinyl chloride-vinyl ester-maleic anhydride copolymer solution, described in Example 1(b), in a 50:50 blend of toluene and tetrahydrofuran.

This primer was tested with the plastisol described in Example 9. The average strip adhesion was 10.0 pounds' pull to primed nylon cloth as compared to 2.5 pounds' pull on unprimed nylon cloth.

Example 16

A primer composition was prepared by mixing 75 parts of the polyurethane resin described in Example 1(a) with 1875 parts of a solution of the vinyl chloride-vinyl ester-maleic anhydride copolymer, described in Example 1(b), in a 50:50 blend of toluene and tetrahydrofuran.

The primer was tested with the plastisol described in Example 9. The average strip adhesion was 9.6 pounds' pull to primed nylon cloth as compared to 2.5 pounds' pull on unprimed nylon cloth.

Example 17

The primer composition and plastisol described in Example 11 was tested on "Orlon" cloth. The average strip adhesion from primed "Orlon" cloth was 8.2 pounds' pull as compared to 4.6 pounds' pull on unprimed "Orlon" cloth.

The term "nylon" as used in the specification and in the appended claims refers to any long-chain polymeric amide which has recurring amide groups as an integral part of the main polymer chain. The term "Orlon" designates a fiber comprising a polymer of acrylonitrile.

What is claimed is:

1. A primer composition consisting essentially of between one and five parts by weight of a liquid polyurethane resin and between one and two parts by weight of a copolymer of vinyl chloride, vinyl ester and one of the materials in the group consisting of maleic acid and maleic anhydride, said polyurethane resin being the product of the reaction between a diisocyanate and polyalkylene glycol, said diisocyanate and said polyalkylene glycol being reacted in such propositions that the NCO/OH ratio is between 1.2 and 3.

2. A primer composition consisting essentially of between one and five parts by weight of a liquid polyurethane resin and between one and two parts by weight of a copolymer of vinyl chloride, vinyl ester and one of the materials in the group consisting of maleic acid and maleic anhydride, said polyurethane resin being the product of the reaction between a diisocyanate and polyalkylene glycol, said diisocyanate being at least one of the diisocyanates in the group consisting of toluene diisocyanate, 2,4 tolylene diisocyanate, 3,3' dimethyl 4,4' biphenylene diisocyanate, 3,3' dimethoxy 4,4' biphenylene diisocyanate, 4,4' diphenyl methane diisocyanate and 4,4' methylene di-o-tolyl isocyanate, said polyalkylene glycol being at least one of the materials selected from the group consisting of polyethylene glycol and polypropylene glycol, said diisocyanate and said polyalkylene glycol being reacted in such proportions that the NCO/OH ratio is between 1.2 and 3.

3. A primer composition consisting essentially of between one and five parts by weight of a liquid polyurethane resin and between one and two parts by weight of a copolymer of vinyl chloride, vinyl ester and one of the materials in the group consisting of maleic acid and maleic anhydride, said polyurethane resin being the product of the reaction between toluene diisocyanate and polyethylene glycol, said diisocyanate and said polyethylene glycol being reacted in such proportions that the NCO/OH ratio is between 1.2 and 3.

4. A primer composition consisting essentially of between one and five parts by weight of a liquid polyurethane resin and between one and two parts by weight of a copolymer of vinyl chloride, vinyl ester and one of the materials in the group consisting of maleic acid and maleic anhydride, said polyurethane resin being the product of the reaction between toluene diisocyanate and polyethylene glycol, said diisocyanate and said polyethylene glycol being reacted in such proportions that the NCO/OH ratio is about 2.

5. An article of manufacture comprising a metal coated with a plasticized polyvinyl chloride resin, said resin and said metal having disposed between and adhering to said metal and said resin a primer consisting essentially of a liquid polyurethane resin and a copolymer of vinyl chloride, vinyl ester and one of the materials in the group consisting of maleic acid and maleic anhydride, said polyurethane resin being the product of the reaction between a diisocyanate and polyalkylene glycol, said diisocyanate and said polyalkylene glycol being reacted in such proportions that the NCO/OH ratio is between 1.2 and 3.

6. An article of manufacture comprising an article of nylon coated with a plasticized polyvinyl chloride resin, said resin and said nylon having disposed between and adhering to said nylon and said resin a primer consisting essentially of a liquid polyurethane resin and a copolymer of vinyl chloride, vinyl ester and one of the materials in the group consisting of maleic acid and maleic anhydride, said polyurethane resin being the product of the reaction between a diisocyanate and polyalkylene glycol, said diisocyanate and said polyalkylene glycol being reacted in such proportions that the NCO/OH ratio is between 1.2 and 3.

7. A process for coating an article with a plasticized polyvinyl chloride resin, said process comprising applying to said article an adhering prime coating, said prime coating consisting essentially of a liquid polyurethane resin and a copolymer of vinyl chloride, vinyl ester and one of the materials in the group consisting of maleic acid and maleic anhydride, said polyurethane resin being the product of the reaction between a diisocyanate and polyalkylene glycol, said diisocyanate and said polyalkylene glycol being reacted in such proportions that the NCO/OH ratio is between 1.2 and 3, and applying a plasticized polyvinyl chloride resin to said prime coating.

8. The primer composition of claim 1 wherein said primer composition is dissolved in an aliphatic ketone solvent.

9. The process of claim 7 wherein said prime coating is applied as a primer composition dissolved in an aliphatic ketone solvent.

References Cited in the file of this patent

UNITED STATES PATENTS

| | | |
|---|---|---|
| 2,329,456 | Campbell | Sept. 14, 1943 |
| 2,411,590 | Powell | Nov. 26, 1946 |
| 2,606,162 | Coffey et al. | Aug. 5, 1952 |
| 2,702,580 | Bateman | Feb. 22, 1955 |